(12) United States Patent
Pravetz et al.

(10) Patent No.: US 7,620,682 B1
(45) Date of Patent: *Nov. 17, 2009

(54) COMMUNICATING DATA USING AN HTTP CLIENT

(75) Inventors: James D. Pravetz, Sunnyvale, CA (US); Richard L. Sites, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 216 days.

This patent is subject to a terminal disclaimer.

(21) Appl. No.: 11/692,069

(22) Filed: Mar. 27, 2007

Related U.S. Application Data

(63) Continuation of application No. 09/624,936, filed on Jul. 25, 2000, now Pat. No. 7,272,628.

(51) Int. Cl.
*G06F 15/16* (2006.01)
(52) U.S. Cl. ........................... 709/203; 719/313
(58) Field of Classification Search ............... None
See application file for complete search history.

(56) References Cited

U.S. PATENT DOCUMENTS

| | | | |
|---|---|---|---|
| 5,572,643 A | 11/1996 | Judson | |
| 5,809,512 A | 9/1998 | Kato | |
| 5,838,906 A | 11/1998 | Doyle et al. | |
| 6,014,688 A | 1/2000 | Venkatraman et al. | |
| 6,052,732 A | 4/2000 | Gosling | |
| 6,078,951 A | 6/2000 | Pashupathy et al. | |
| 6,230,189 B1 | 5/2001 | Sato et al. | |
| 6,324,645 B1 | 11/2001 | Andrews et al. | |
| 6,397,246 B1 | 5/2002 | Wolfe | |
| 6,542,472 B1 | 4/2003 | Onuma | |
| 6,651,084 B1 | 11/2003 | Kelley et al. | |
| 6,760,752 B1 | 7/2004 | Liu et al. | |
| 6,766,305 B1 | 7/2004 | Fucarile et al. | |
| 7,234,114 B2 * | 6/2007 | Kurtz et al. | 715/746 |
| 7,293,099 B1 * | 11/2007 | Kalajan | 709/230 |
| 2002/0010746 A1 | 1/2002 | Jilk et al. | |
| 2002/0124167 A1 | 9/2002 | Toyota et al. | |
| 2003/0028768 A1 | 2/2003 | Leon et al. | |
| 2004/0243837 A1 | 12/2004 | Fredette et al. | |

OTHER PUBLICATIONS

Adams, et al. "Internet X.509 Public Key Infrastructure Certificate Management Protocols", The Internet Society, 1999, 72 pages.

(Continued)

*Primary Examiner*—Patrice Winder
(74) *Attorney, Agent, or Firm*—Fish & Richardson P.C.

(57) ABSTRACT

An apparatus includes a computer executable for processing a file of a first file type, and a Hypertext Transfer Protocol ("HTTP") client that receives files of the first type and a second type from a network. The HTTP client causes the computer executable to process files of the first type. The computer executable includes a first module that determines whether the file includes a first content type and performs a first function if the file includes the first content type. The computer executable also includes a second module that determines whether the file includes a second content type and performs a second function different from the first function if the file includes the second content type.

27 Claims, 11 Drawing Sheets

OTHER PUBLICATIONS

Adobe Acrobat Forms System "Implementation Notes", 1998, 6 pages.
Adobe Systems Incorporated, "Adobe Acrobat® 5.0 Help", Released Apr. 9, 2001, pp. 142, 160-161, 163, 167-171, 205-206.
Adobe Systems Incorporated, "Forms Data Format", PDF 1.3 Reference Manual, Mar. 11, 1999, pp. 485-494.
Adobe Systems Incorporated "FDF Toolkit Overview and Reference" Technical Note #5194, Version: Acrobat 5.0, Sep. 2001, pp. 3-13.
Adobe Systems Incorporated "PDF Reference, Second Edition; Adobe Portable Document Format Version 1.3", Jul. 2000 pp. 460-468.
Dusse, et al. S/MIME Version 2 Certificate Handling, RFC 2312, Mar. 1998, URL:http://www.ietf.org/rfc/rfc2312.txt retrieved online Jul. 31, 2006, pp. 1-19.
Bienz, et al. "PDF Reference Manual Version 1.2", Adobe Systems Incorporated, Nov. 27, 1996, pp. 129-130, 369, 373-376.
Dusse, et al. "S/MIME Version 2 Message Specification", Mar. 1998, 37 pages.
Miller, "Adding Certificates to your WAB", 1997-1999, 2 pages.
Miller, "Downloading Digital IDs", 1997-1999, 1 page.
Network Associates, Inc., "PGP Desktop Security 7.0", 2000, pp. 1-3.
Networks Associates Technology, Inc., "What's New in PGP Desktop Security Version 7.1", 1990-2001, pp. 1-4.
PGP Corporation "PGP Corporate Desktop for Windows", 2002, pp. 1-4.
PGP Corporation "PGP Mail for Windows", 2002, pp. 1-3.
PGP Corporation, "PGP Technology Specifications", 2002, pp. 1-2.
RSA Laboratories, "PKCS #7: Cryptographic Message Syntax Standard", Nov. 1, 1993, 30 pages.
Schneier, "Applied Cryptography", $2^{nd}$ Edition, 1996, John Wiley & Sons, pp. 577-583.
Stallings, "Cryptography and Network Security", $2^{nd}$ Edition, 1998, Prentice Hall, pp. 450-455.
WinZip Internet Browser Support Add-On, http://www.winzip.com/ibrowser.htm, 3 pages, Dec. 2000.
WinZip Internet Browser Support Add-On, http://www.wayback.com at www.winzip.com, 3 pages, Dec. 2000.

* cited by examiner

COMMUNICATING DATA USING AN HTTP CLIENT

CROSS-REFERENCE TO RELATED APPLICATIONS

This application is a continuation application of, and claims priority to, U.S. patent application Ser. No. 09/624,936, entitled Communicating Data Using an HTTP Client, to inventors James D. Pravetz and Richard L. Sites, which was filed on Jul. 25, 2000, now U.S. Pat. No. 7,272,628. The disclosure of the above application is incorporated herein by reference in its entirety.

TECHNICAL FIELD

This invention relates to communicating data using an HTTP client.

BACKGROUND

The Hypertext Transfer Protocol ("HTTP") is a protocol defined by the Internet Engineering Task Force ("IETF") for transmitting data over a network, such as the Internet. Computer programs, such as web browsers, that communicate data by the hypertext transfer protocol ("HTTP") are known as HTTP clients. The HTTP clients send data to the server, which may include a request for data from the server over the network. In response, the server may send data by HTTP to the client. HTTP clients may also send additional data to the server using either a "POST" or a "GET" method of the HTTP protocol.

An HTTP client may invoke another computer executable to enhance the client's functionality. For example, the HTTP client may call on a separate executable to display a certain file format, such as a portable document format ("PDF") file. The computer executable may be a separate stand-alone computer application, a dynamically linked library ("DLL"), or a helper program or plugin written for the HTTP client. The HTTP client may be linked to the executable through the operating system, an application program interface ("API") of the HTTP client, or through a mime-type table within the HTTP client associating file formats with computer executables.

SUMMARY

In general, one aspect of the invention relates to an apparatus that includes a computer executable for processing a file of a first file type, and a Hypertext Transfer Protocol ("HTTP") client that receives files of the first type and a second type from a network. The HTTP client causes the computer executable to process files of the first type. The computer executable includes a first module that determines whether the file includes a first content type and performs a first function if the file includes the first content type. The computer executable also includes a second module that determines whether the file includes a second content type and performs a second function different from the first function if the file includes the second content type.

Embodiments of the invention may include one or more of the following features. The first content type includes a set of instructions and the first module executes the instructions. The apparatus is associated with a computer processor and the computer executable further comprises an extraction module, the instructions causing the extraction module to extract information from the computer. The computer executable further comprises a third module for transmitting the extracted information by generating a HTTP request containing the information and sending the HTTP request over the network. The extracted information includes habitat information, such as a machine ID, a storage ID, an Ethernet address, or a processor ID. The instructions in the first content type cause the first module to install computer software on a computer associated with the apparatus. The computer software is an updated version of the computer executable for processing a file. The computer executable further comprising an HTTP module that generates a hypertext transfer protocol method, such as a PUT or a GET, for sending the extracted information over a network.

At least one of the first and second functions includes displaying, uncompressing, or storing at least a portion of the information contained within the file.

In general, a second aspect of the invention relates to a method that includes a HTTP client receiving a file and information about the type of the file, the HTTP client determining an computer executable associated with the file based on the information about the type of the file, the HTTP client causing the computer executable to process the file, the computer executable determining whether the file includes a first content type, the computer executable performing a first function if the file includes the first content type; and the computer executable determining whether the file includes a second content type, the computer executable performing a second function different from the first function if the file includes the second content type.

Embodiments of the second aspect of the invention may include one or more of the following features. The computer executable generates a HTTP request containing information and sends the information by sending the HTTP request over a network. The first content type includes a set of instructions and the first function includes executing the instructions. The method is associated with a computer and the instructions cause the extraction module to extract information from the computer. The extracted information includes habitat information, such as a machine ID, a storage ID, and an Ethernet address. The instructions cause the computer executable to install computer software on the computer. For example, the installed computer software may be an updated version of the computer executable. The method further includes generating a hypertext transfer protocol method, such as a PUT or a GET, for sending the extracted information over a network.

At least one of the first and second functions includes uncompressing, displaying, or storing at least a portion of the information contained within the file. The file contains both the first content type and the second content type, the computer executable processing the file to perform both the first and the second function.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
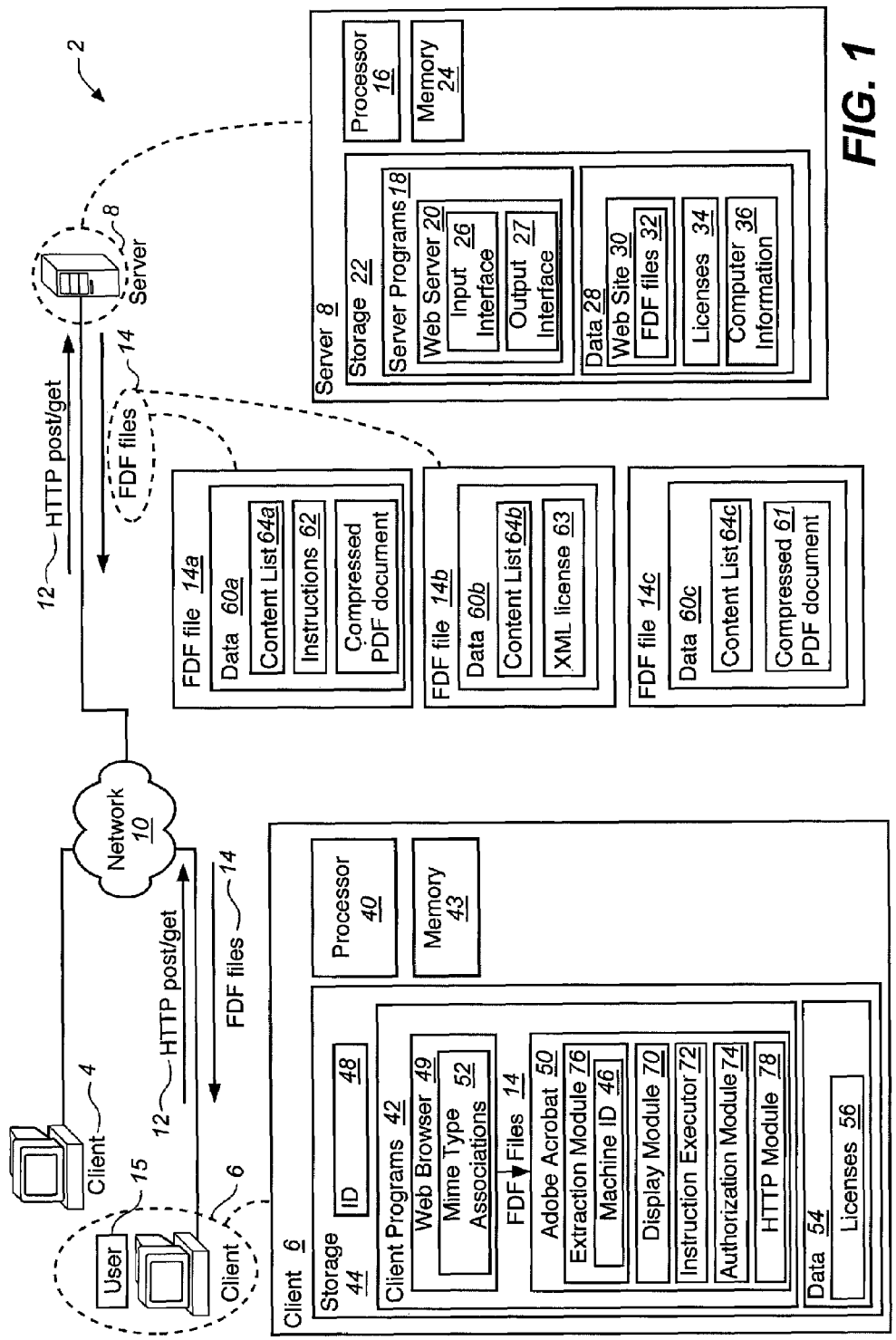
FIG. 1 is a block diagram of a system for communicating with a computer executable.

Referring to FIG. 1, a system for communicating with a computer executable includes client computers 4, 6 that communicate with a server 8 over a network 10. The client computers 4, 6 send information, for example using POST or GET methods 12 of HTTP, to the server 8. The server 8 sends information such as forms data format ("FDF") files 14 to the client computers 4 and 6.

The server 8 includes a processor 16 and memory 24 for executing server programs 18, such as a web server 20, stored within a storage subsystem 22, which is associated with the server 8. Storage subsystem 22 may include one or more storage devices such as a floppy disk, CDROM, hard disk, or a hard disk array. The web server 20 includes an input interface 26 for receiving information 12 from the client computers 4, 6 and an output interface 27 for sending information 14 to the client computers. The server programs 18 store data 28, such as a web site 30 that includes FDF files 32, licenses 34 and information 36 about client computers 4, 6, within storage 22.

The client computer 6 includes a processor 40 and memory 43 for executing client programs 42 stored within a storage subsystem 44 associated with the client computer 6. Storage subsystem 44 may include one or more storage devices such as a floppy disk, CDROM, hard disk or a disk array. Storage subsystem 44 is assigned a storage identifier ("storage ID") 48 by an operating system of the client computer 6. The client programs 42 include a web browser 49 that sends and receives information, such as files, via the network 10. Storage 44 also contains a helper computer executables 50, such as Adobe Acrobat™ by Adobe Systems Inc., which enhance the functionality of web browser 49. The client programs 42 store data 54, such as licenses 56, within storage 44.

The web browser 49 maintains a collection of mime-type associations 52 relating different file types (also known as mime-types) with their corresponding computer applications for enhancing the functionality of the web browser 49. For example, the associations 52 relate FDF files 14 with Helper executable 50. Consequently, the web browser 49 causes Helper executable 50 to process any FDF files 14 that are received from the network 10.

The FDF files 14a, 14b, 14c contain data 60a, 60b, 60c. For example, FDF file 14a includes a set of instructions 62 directing Helper executable 50, for example, to extract the storage ID 48 and send it to the server 8, while FDF file 14c contains a compressed document 61 in portable document format ("PDF"). On the other hand, FDF file 14b contains a license 63 ("XML license") authorizing the client computer 6 to open the PDF document 61 contained within the FDF file 14c. Each of the FDF files 14a, 14b, 14c contains a content list 64a, 64b, 64c listing the content-types of the different kinds of data 60a, 60b and 60c in the file. For instance, the content list 64a for file 14a would be:

Instruction File the content list 64b for file 14b would be:

License file while the content list 64c for the file 14c would be

PDF file.

The content listing makes it easier for Helper executable 50 to determine what to do with the data.

Helper executable 50 includes a display module 70 for uncompressing compressed files and displaying PDF documents, an instruction executor 72 for executing instructions stored within an FDF file, and an authorization module 74 for determining whether an XML license is required to display a PDF document. Executable 50 also includes an extraction module 76 for extracting information from client computer 6 and an HTTP module 78 for sending the extracted information to the server 8 over the network 10 by generating and sending an HTTP post or get method 14 containing the extracted information. Thus, the system 2 allows the sever 8 to send information to Helper executable 50 as FDF files while allowing Executable 50 to send extracted information to the server as HTTP put or get methods.

The extraction module 76 extracts such information as the storage ID and other information about client computer 6, collectively known as habitat or environment information. The extraction module 76 generates a machine ID for identifying the client computer 6 based on the habitat information. For example, the machine ID may be based on an identifier assigned to the processor 40 by its manufacturer, an Ethernet address of a network interface card associated with the client computer 6, or an identifier assigned to the client computer 6 by an operating system.

Figure 2A:
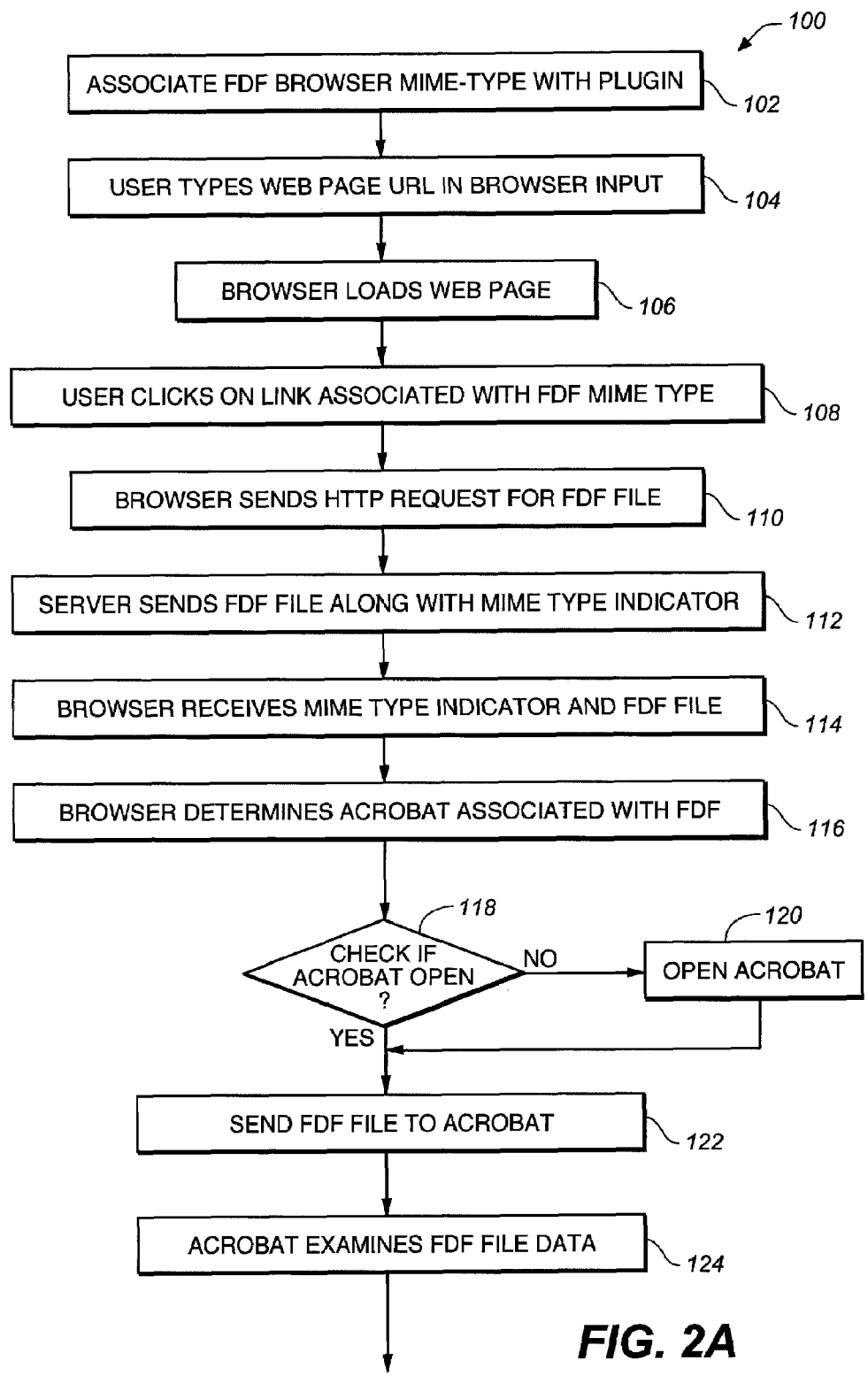
FIGS. 2 and 3 are flow charts of the process implemented by the system of FIG. 1.
Figures 2, 2A, 2B:
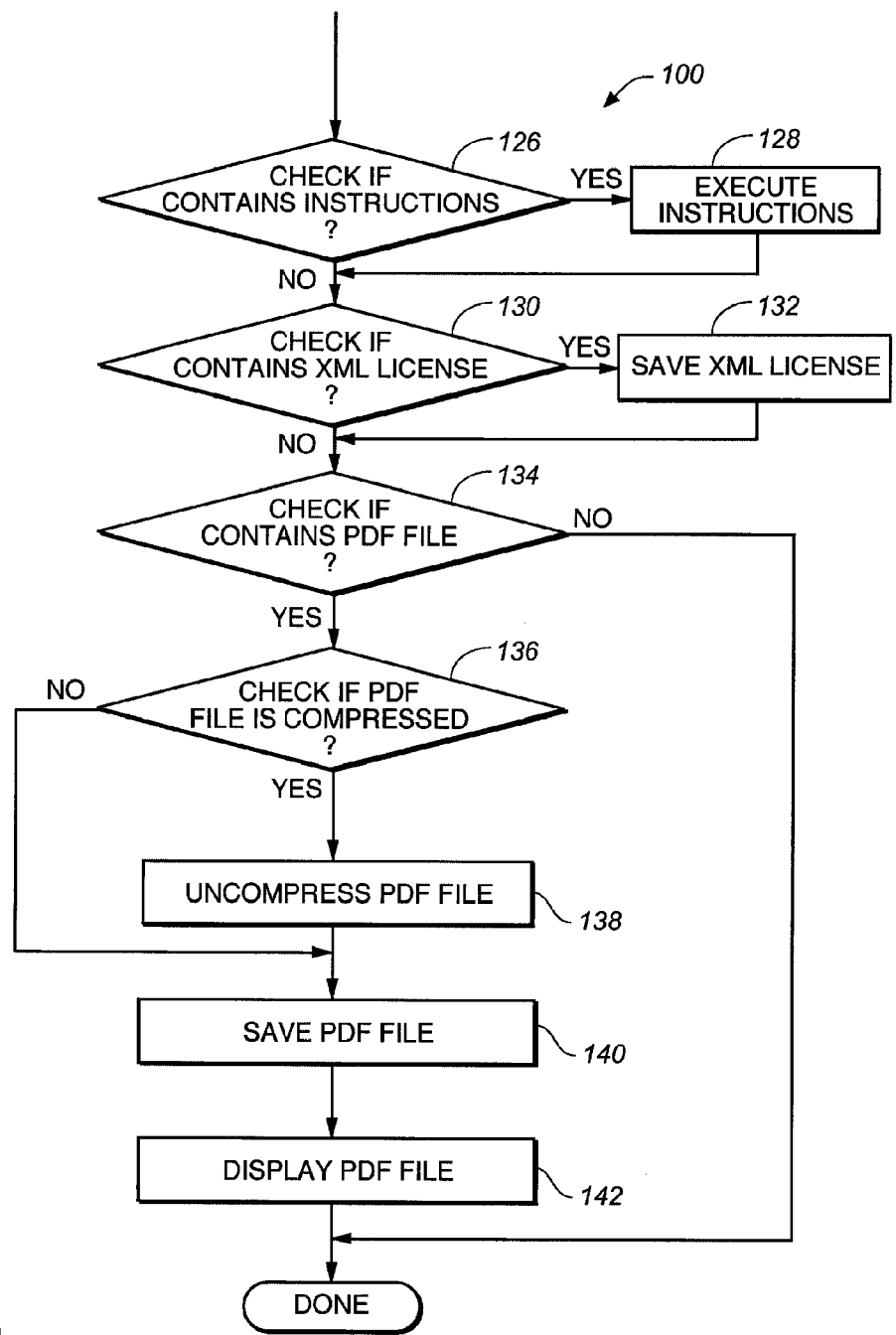

Referring to FIG. 2, the process 100 for communicating information from server 8 to helper executable 50 will be described. The process 100 includes a web browser 49 associating (102) the FDF file type or MIME-type with Helper executable 50. A MIME type is a Multipurpose Internet Mail Extensions type and is used to indicate the type of document being transmitted over the Internet, for example, in an email message. The association may be performed, for example, as part of the installation of Helper executable 50 on the client computer 6 or as part of the installation of the web browser 49. When the user 15 types (104) the URL of a web page associated with the server 8, the web browser 49 loads (106) (i.e. the browser retrieves and displays the web page) the web page. The web page includes a link to a FDF file 14. The user 15 initiates the transmission of the web page to the client computer 6 by clicking (108) on the link associated with the FDF file 14 causing the web browser 49 to send (110) a HTTP request for the FDF file to the server 8. The server 8 responds to the request by sending (112) the FDF file along with information indicating the mime-type of the file to the browser 49.

Upon receiving (114) the mime-type of the FDF file, the web browser 49 determines (116) that Helper executable 50 is associated with the FDF mime type based on the mime type associations 52. The web browser 49 checks (118) whether Helper executable 50 is open and opens (120) Executable 50 if it is not open. The web browser 50 sends (122) the FDF file to Executable 50, for example, using the Object Linked Embedding ("OLE") API by Microsoft Corporation.

Executable 49 examines (124) the data 60a, 60b contained within the FDF file to determine the content type of the data. If the data 60a, 60b contains (126) instructions 62, the instruction executor 72 executes (128) the instructions 62, and if the data 60a, 60b contains (130) an XML license 63, Helper executable 50 saves the license 63 as data 54 within storage 44. If the data contains a PDF document 61, the display module 70 checks (136) whether the PDF document 61 is compressed and uncompresses (138) it if it is compressed. The display module 70 then saves (140) and displays (142) the PDF document 61.

Figure 3:
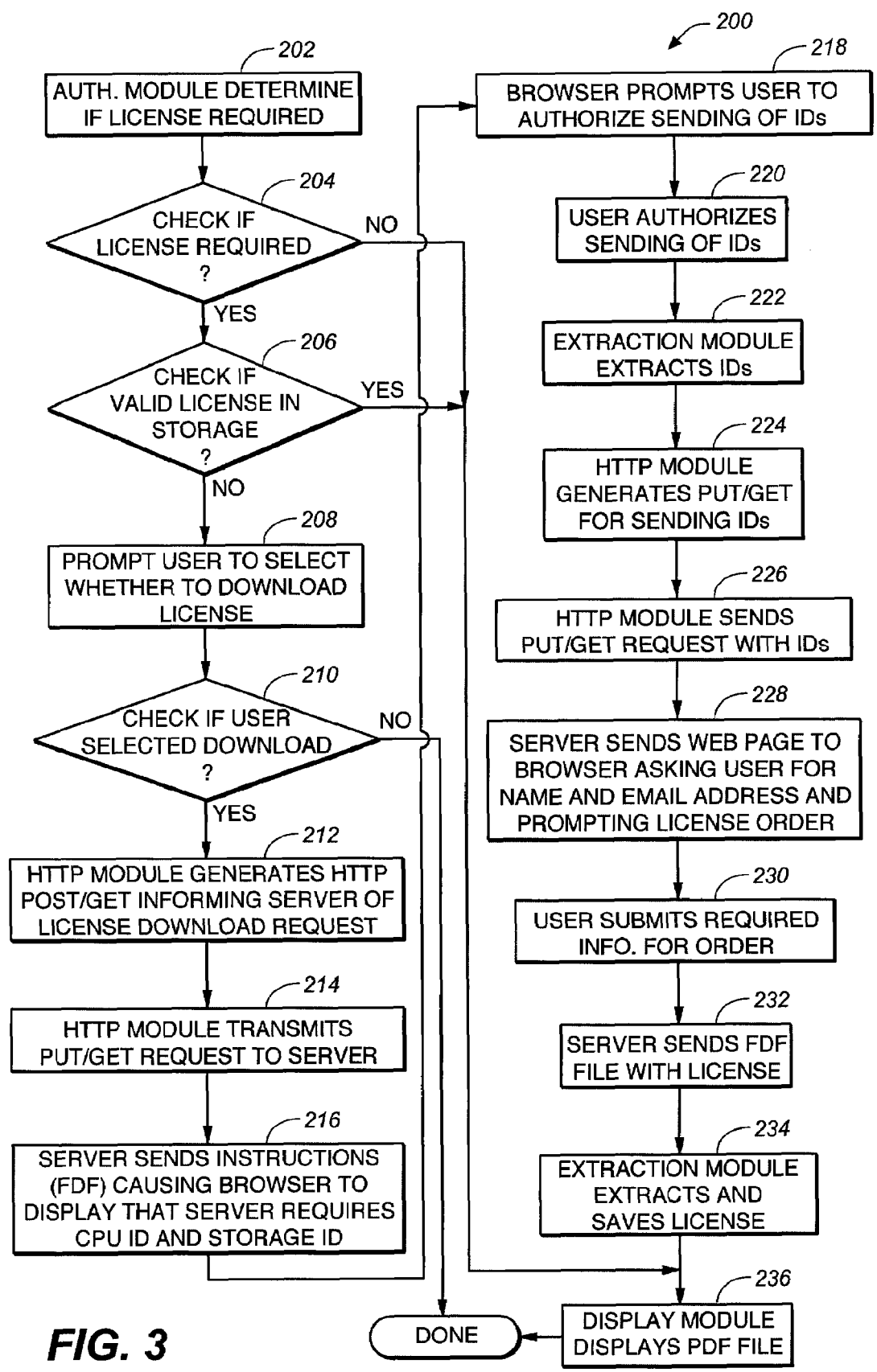

Referring to FIG. 3, the processing 200 performed on downloading the FDF file 14C will be described. The authorization module 74 to determines (202) whether a license is required to display the PDF document 61 contained within the FDF file by examining the document. If a license is not required, the display module 70 displays (236) the file. Otherwise, if a license is required, the authorization module checks (206) whether data 54 includes a valid license for the PDF document 61. If data 54 includes a valid license, the display module 70 displays (236) the file. Otherwise, the authorization module prompts (208) the user 15 to select whether or not to download the license. The authorization module then checks (210) whether the user 15 has selected to download the license. If the user 15 has selected not to download a license, Executable 50 terminates the processing 200.

Otherwise, if the user 15 has selected to download a license, the HTTP module generates (212) a HTTP post or get request informing the server 8 that the user 15 has requested the download of a license. The http module transmits (214) the put/get request to the server 8. The server 8 responds to the put/get request by sending (216) an FDF file 14*a* that contains instructions that cause the web browser to display that the server requires the client computer's Machine ID 46 and Storage ID 48 to issue a license. The instructions also cause the browser 49 to prompt (218) the user 15 to authorize the sending of the IDs 46, 48. The user 15 authorizes (220) sending of the IDs 46, 48 on the web browser 49 allowing the extraction module 76 to extract (222) the IDs from client computer 6, for example, by querying the operating system associated with the client computer 6. The HTTP module 78 then generates (224) a put/get request 12 containing the extracted information and sends (226) the put/get request 12 to the server 8.

The server 8 sends (228) a web page to the browser 49 asking the user 15 for the user 15's name and email address and prompting the user 15 to order a license. The user 15 submits (230) the information required to order a license on the web browser causing the server 8 to send (232) the FDF file 14*b* containing the XML license 63 required to display the PDF document 61. The authorization module 74 extracts (234) and saves the license 63 within data 54. The license 63 includes information about the machine ID 46 and the storage ID 48 of the client computer 6. The display module then displays (236) the PDF file 61 to the user 15.

When the user 15 later tries to open the same PDF file 61, the authorization module retrieves the license 63 from storage 44 and checks whether the license bears the same machine ID 46 and the storage ID 48 as the client computer 6. If the license is valid but does not have the same machine ID 46 and the storage ID 48 as the client computer 6, Executable 50 prompts the user 15 to get a license for the computer before displaying the file. Thus the method of communicating may be used to license PDF documents to client computers 6. The PDF documents may represent books, magazines, and so forth.

Figure 4A:
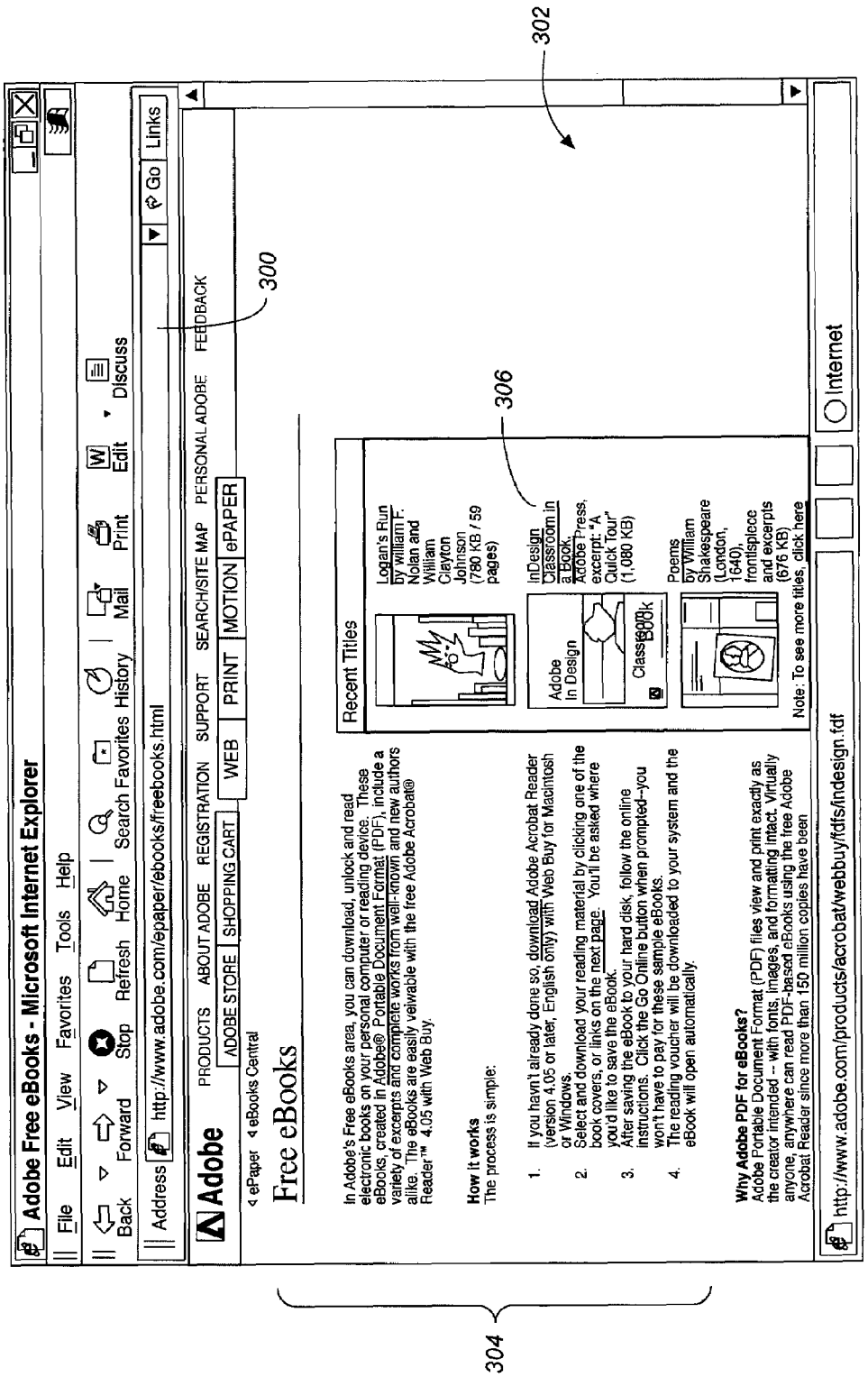
FIGS. 4A-10 are screenshots of different user interface screens presented by the system of FIG. 1.
Figure 4B:
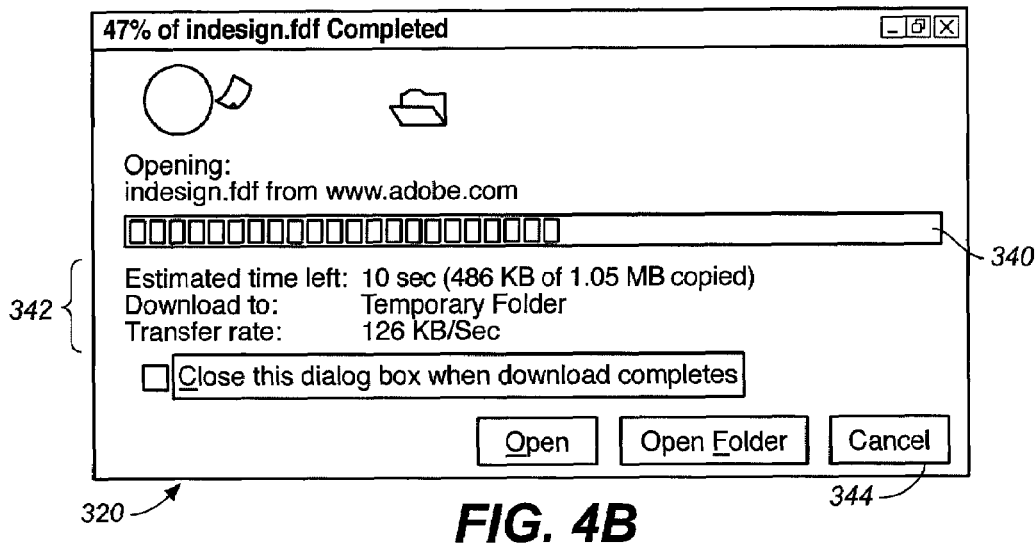

Referring to FIG. 4A, when the user 15 types (102, FIG. 2) the URL of the web page 302 associated with the server 8, the web browser 49 displays the web page 302 on a monitor associated with the client computer 6. The web page 302 includes instructions 304 on how to download electronic books contained within FDF files and a link 306 to the FDF file 14*a*. The user 15 downloads the FDF file 14*a* by clicking on the link 306 using a mouse pointer associated with the client computer 6, causing the web browser 49 to display the download screen 320, shown in FIG. 4B. The download screen 320 includes a graphical indicator 340 which shows how much of the FDF file 14*a* has been downloaded along with details 342 about the download process, such as the download transfer rate 342*a*, the location where the file is being downloaded to 342*b*, and an estimate of how much time 342*c* is left before the file is fully loaded. The user 15 may cancel the download by clicking on the cancel button 344.

Figure 5A:
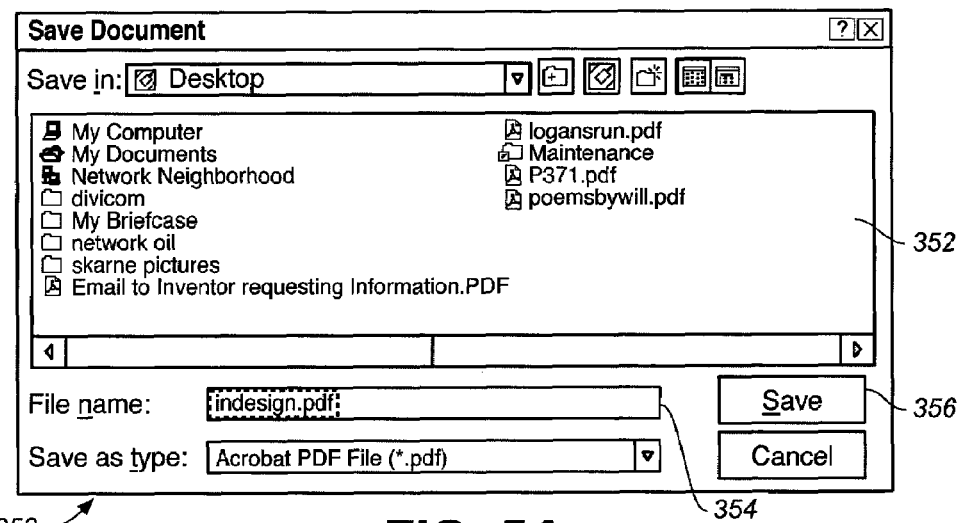
Figure 5B:
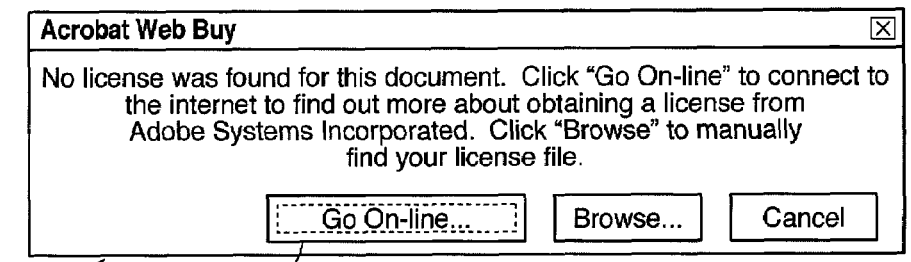

Referring to FIG. 5A, once the file is downloaded, the Helper executable 50 displays a dialog for saving a PDF file 61 contained within the FDF file 14*a*. To save the file 61, the user 15 selects a directory by clicking on a directory name in input 352, enters a file name in input and then clicks on the save button 356. After saving the file, Executable 50 determines that client computer 6 does not have a valid license for the file 61 within storage 44 and displays the dialog 370, prompting the user 15 to select whether download a license from the server 8. The user 15 opts to download a license by clicking on the "go online" button 372.

Figure 6:
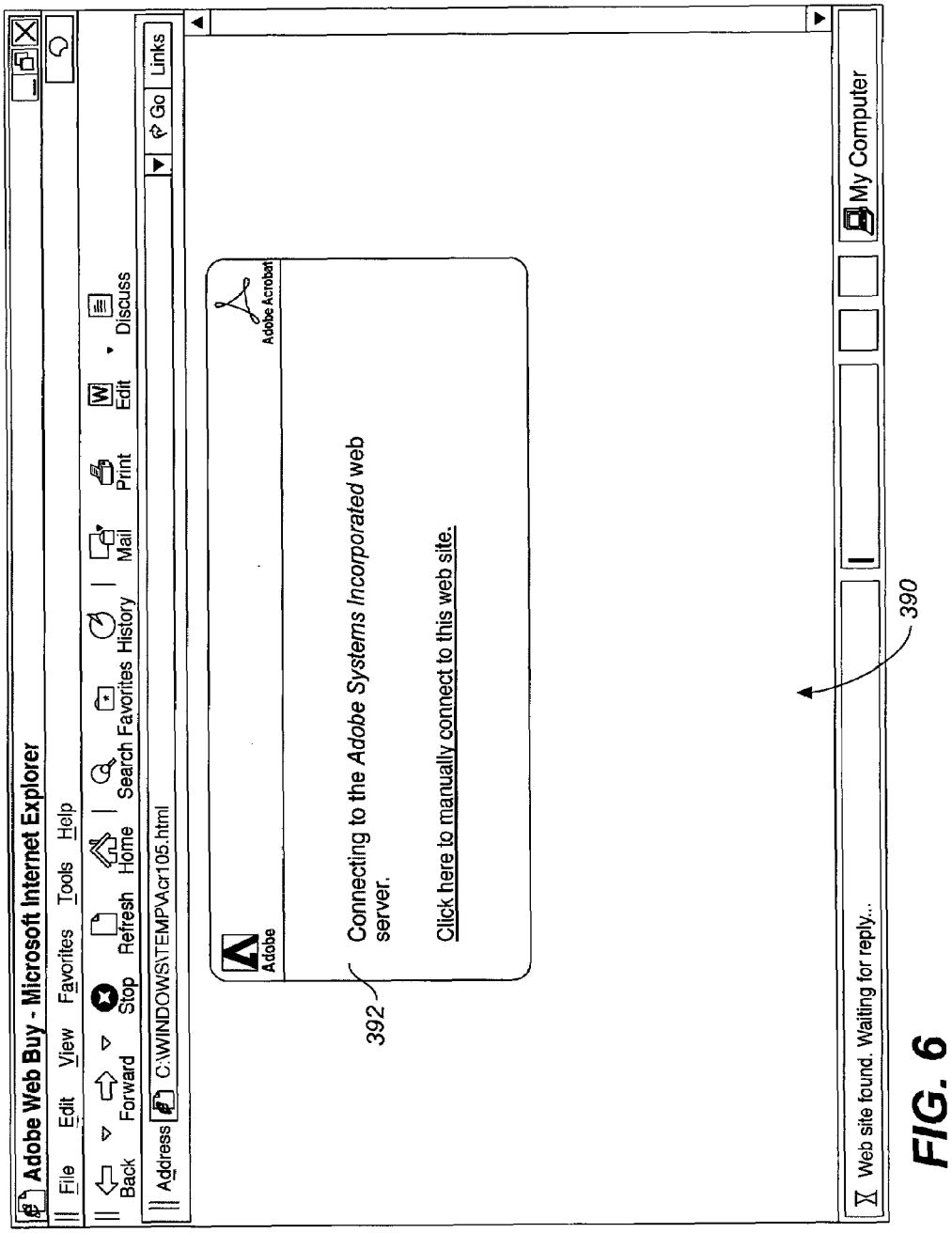

Referring to FIG. 6, Executable 50 causes the browser 50 to display a web page 390 while Executable 50 is generating (212 FIG. 3) and sending (214 FIG. 3) a put/get request to the server to inform the server that the user 15 would like to download a license. The web page 390 contains information 392 informing the user 15 that the Executable 50 is communicating with the server 8.

Figure 7:
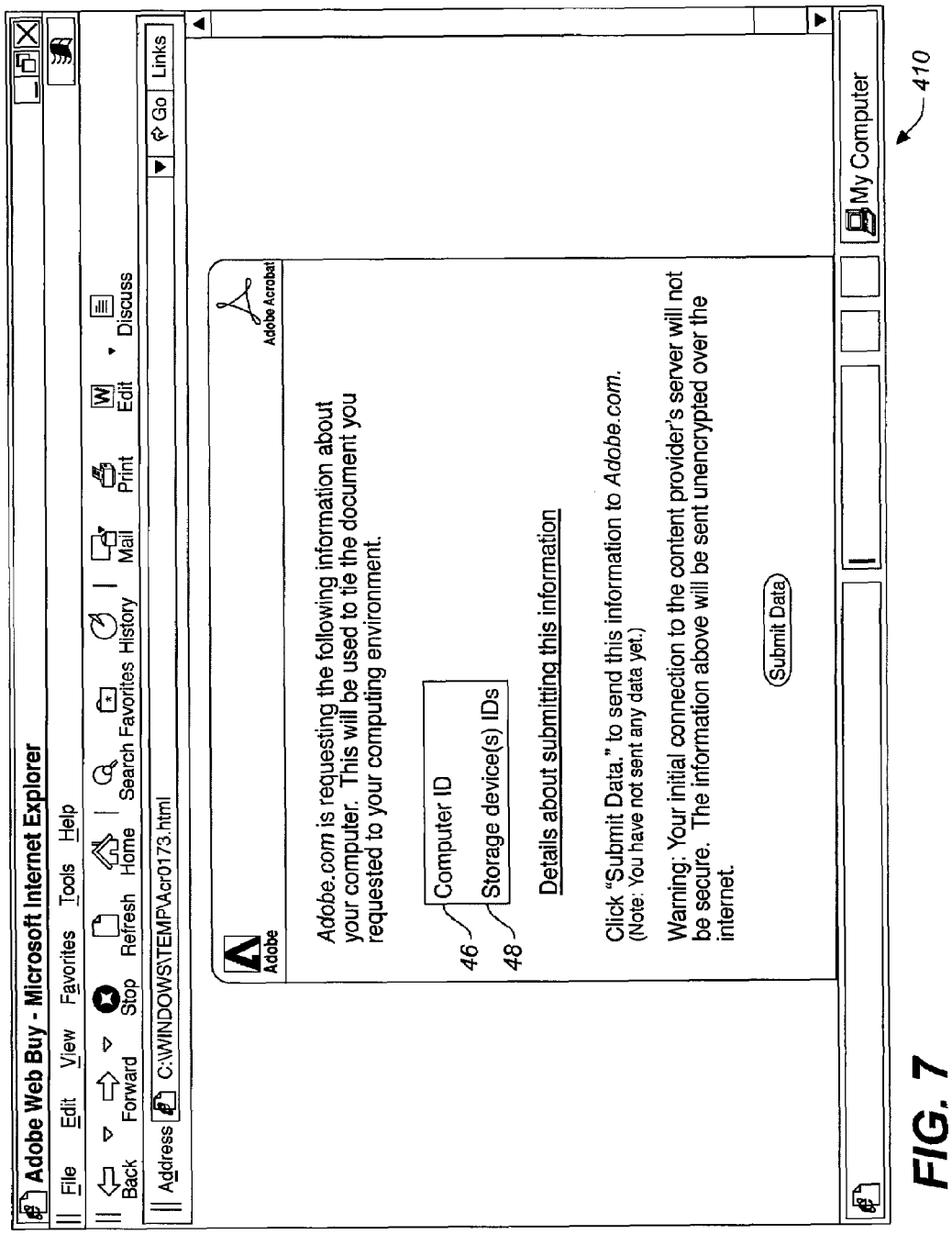

Referring to FIG. 7, the FDF file sent (216 FIG. 3) by the web server includes instructions, which are executed by Executable 50 to cause the web browser to display a web page 410. The web page informs the user 15 that server 8 is requesting the computer ID 46 and the storage ID 48 of the client computer 6. The user 15 opts to submit the IDs 46, 48 by clicking on the submit button 420.

Figure 8:
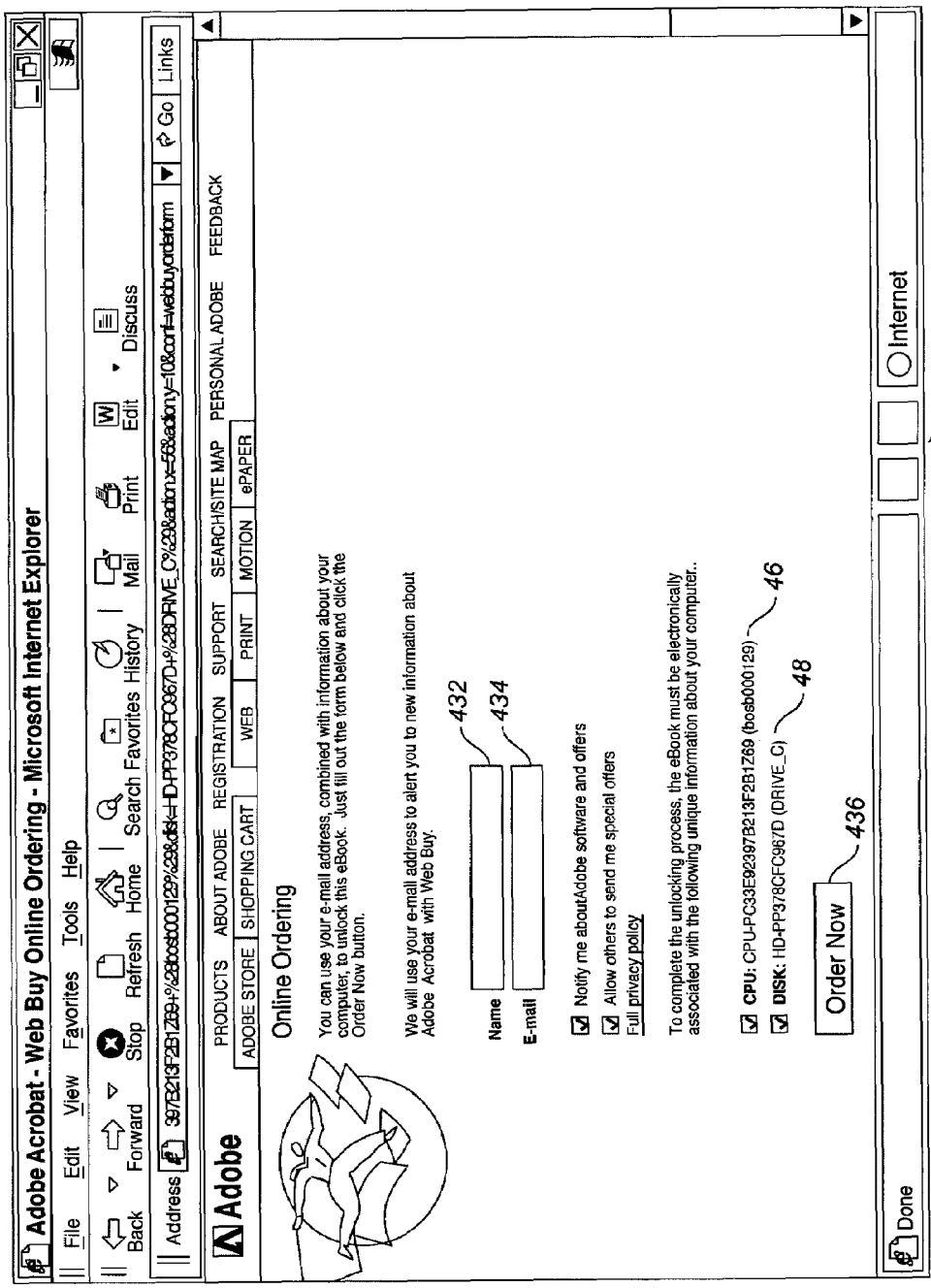

Referring to FIG. 8, after the extraction module 76 has extracted the ID information from the client computer 6, the server 8 sends the web page 430 to the web browser 50, which displays the web page 430. The user 15 enters his name into a "name" input 432 and his electronic mail address into an "e-mail" input 434. The user 15 also selects to send the extracted Machine ID 46 and storage ID 48. To order the license 63, the user 15 submits the information on the page 430 by clicking on the "order" button 436.

Figure 9:
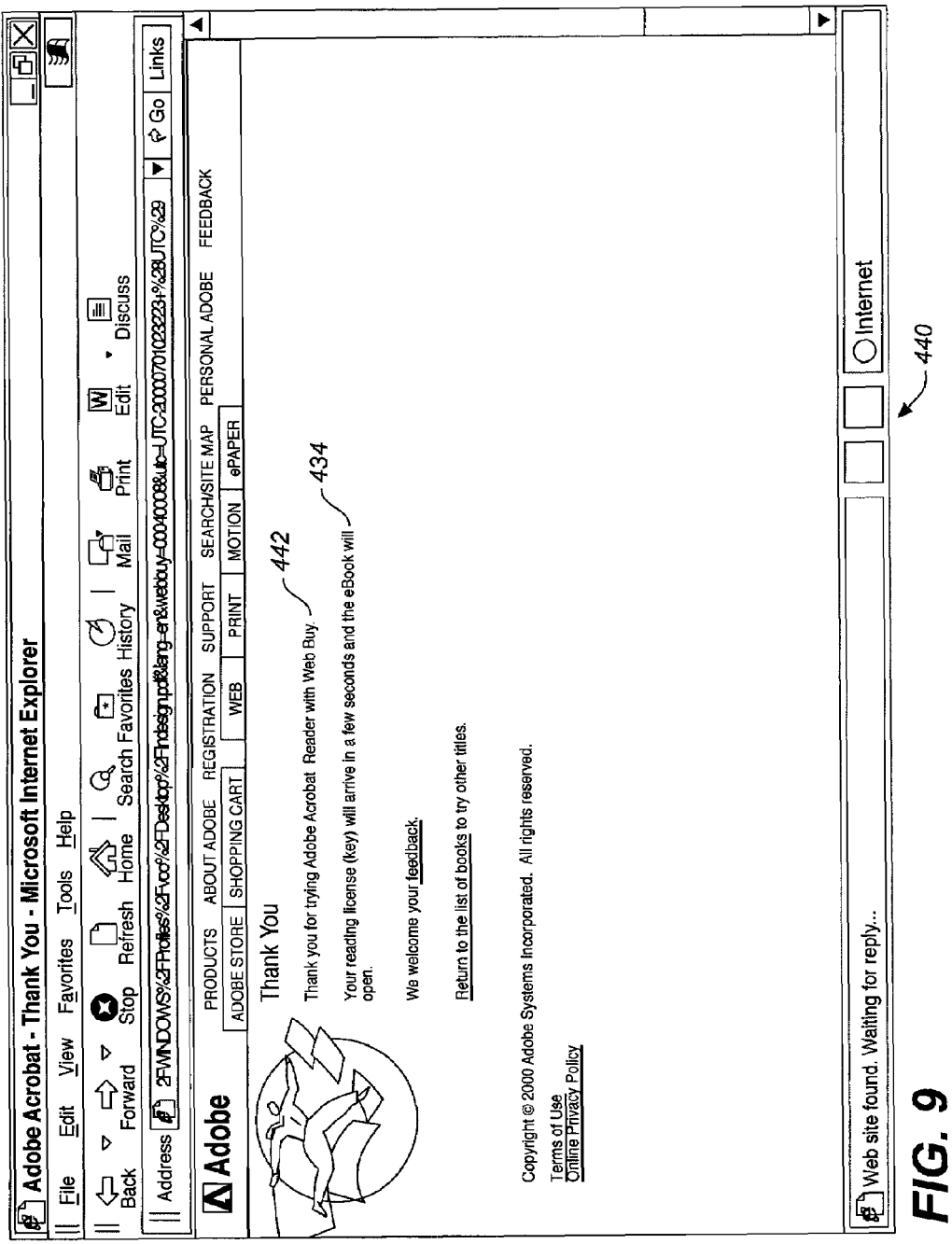

Referring to FIG. 9, after ordering the page, the web browser 50 displays the web page 440 that includes a paragraph 442 thanking the user 15 for downloading the license. The web page also includes a paragraph 434 informing the user 15 that the server 8 is sending a license to the client computer 6.

Figure 10:
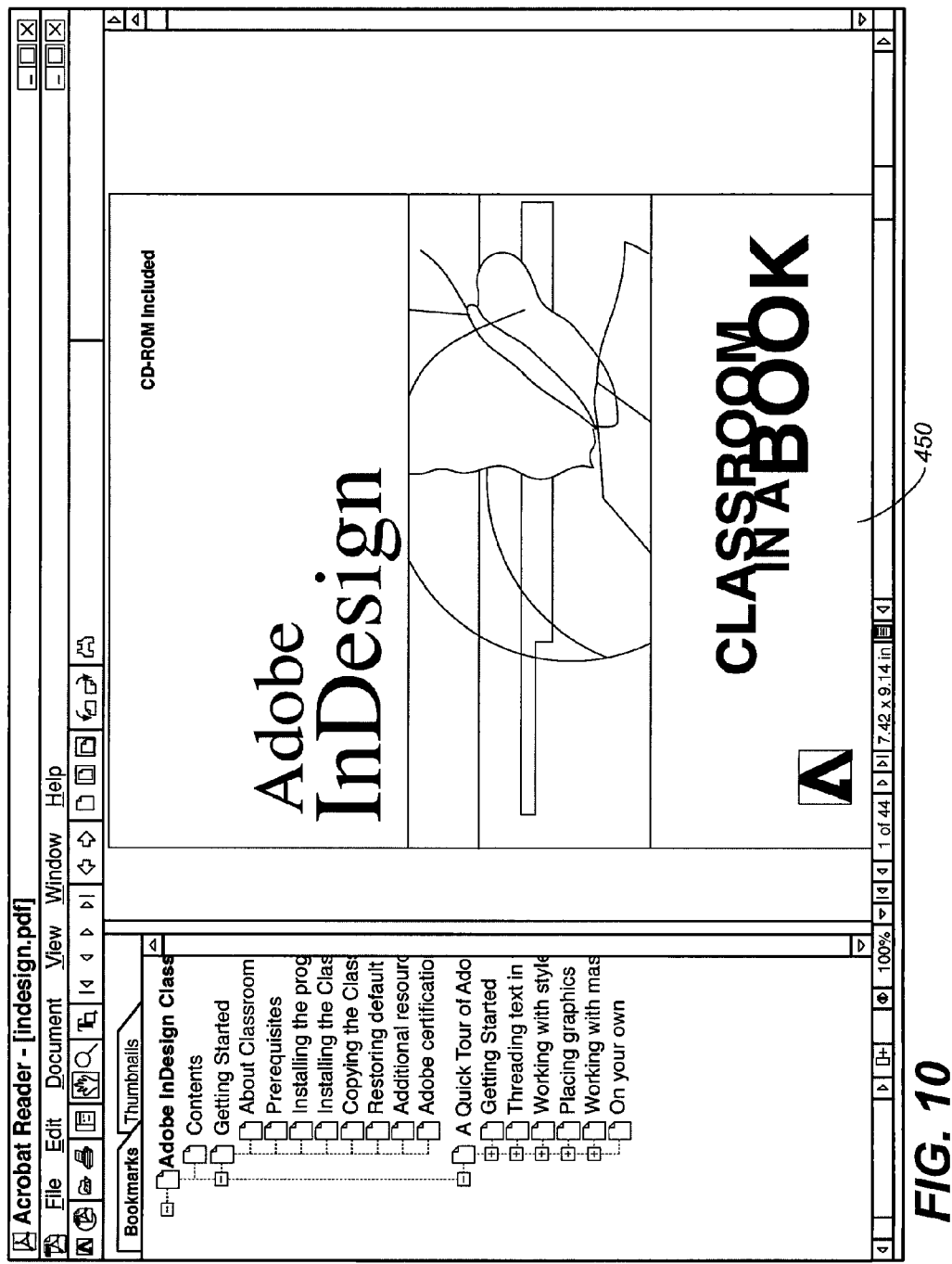

Referring to FIG. 10, Executable 50 displays the contents PDF file when the downloading of the license is completed.

A number of embodiments of the invention have been described. Nevertheless, it will be understood that various modifications may be made without departing from the spirit and scope of the invention. For example, the method of communicating with an executable is not limited to Acrobat and may be applied to any executable or web browser plugin. Similarly, a different document format or mime-type from the FDF format may be used to represent the files. The files may contain any one or any combination of instructions, files or licenses. The files contained within the document format need not be a PDF document. It may, instead, be a computer program. For example, the FDF file may contain a newer version of Helper executable 50 and the system 2 (FIG. 1) may allow the server 8 to update the version of Helper executable 50 by downloading the newer version in an FDF file that also contains instructions on how to install Acrobat 50.

The files need not be related to a computer executable by a mime-type association. They could, instead, be related to a computer executable by some other association, such as an operating system association. Similarly, the information extracted from the client computer need not be a machine ID or a storage ID. It could be any information about the environment or habitat of the computer. For example, the information may be a public key stored within the storage subsystem, a username/password pair, a date or a time.

Accordingly, other embodiments are within the scope of the following claims.

What is claimed is:

1. A computer program product, encoded on a computer-readable storage medium, for processing a file, the computer program product comprising instructions that when executed by a processor are operable to cause data processing apparatus to perform operations comprising:
   receiving in a web browser a file over a network, the file having a file type, the file having file content, the file type being associated with a computer executable, the computer executable being software external to the web browser, the web browser being linked to invoke the computer executable to perform processing of files of the file type; and
   executing the computer executable upon receipt of the file, the computer executable:
      determining whether the file content includes content of a first content type and performing a first function if the file content includes content of the first content type, and
      determining whether the file content includes content of a second content type and performing a second function different from the first function if the file content includes content of the second content type.

2. The computer program product of claim 1, further comprising:
   generating an HTTP request containing information and sending the information by sending the HTTP request over a network.

3. The computer program product of claim 1, where the content of the first content type includes instructions content and the first function executes the instructions content.

4. The computer program product of claim 3, where the web browser is executing on a computer, the instructions content causing the computer executable to extract habitat information from the computer.

5. The computer program product of claim 4, where the habitat information includes at least one of a machine ID, a storage ID, an Ethernet address, or a processor ID.

6. The computer program product of claim 3, where the instructions content causes the computer executable to install computer software on the computer.

7. The computer program product of claim 6, where the computer software is an updated version of the computer executable.

8. The computer program product of claim 1, where at least one of performing the first function and performing the second function includes displaying at least a portion of the file content.

9. The computer program product of claim 1, where at least one of performing the first function and performing the second function includes uncompressing at least a portion of the file content.

10. The computer program product of claim 1, where at least one of performing the first function and performing the second function includes storing at least a portion of the file content.

11. The computer program product of claim 1, where the file content includes both content of the first content type and content of the second content type, the computer executable processing the file to perform both the first function and the second function.

12. The computer program product of claim 1, where the computer executable is a browser plug-in.

13. The computer program product of claim 1, where the computer executable is a helper application.

14. The computer program product of claim 13, where the helper application is a computer executable associated with a PDF file format.

15. The computer program product of claim 1, where the web browser is executing on a computer, further comprising:
   extracting information from the computer; and
   transmitting the extracted information by generating an HTTP request containing the information and sending the HTTP request over the network.

16. A system comprising:
   a user input device, a display, a memory device, and a processor programmed to:
      receive in a web browser a file over a network, the file having a file type, the file having file content, the file type being associated with a computer executable, the computer executable being software external to the web browser, the web browser being linked to invoke the computer executable to perform processing of files of the file type; and
      execute the computer executable upon receipt of the file, the computer executable:
         determining whether the file content includes content of a first content type and performing a first function if the file content includes content of the first content type, and
         determining whether the file content includes content of a second content type and performing a second function different from the first function if the file content includes content of the second content type.

17. The system of claim 16, where the processor is further programmed to:
   generate an HTTP request containing information and sending the information by sending the HTTP request over a network.

18. The system of claim 16, where the content of the first content type includes instructions content and the first function executes the instructions content.

19. The system of claim 18, where the web browser is executing on a computer, the instructions content causing the computer executable to extract habitat information from the computer.

20. The system of claim 18, where the instructions content causes the computer executable to install computer software on the computer.

21. The system of claim 16, where at least one of performing the first function and performing the second function includes displaying at least a portion of the file content.

22. The system of claim 16, where at least one of performing the first function and performing the second function includes uncompressing at least a portion of the file content.

23. The system of claim 16, where at least one of performing the first function and performing the second function includes storing at least a portion of the file content.

24. The system of claim 16, the processor further programmed to:
   extract information from a computer; and
   transmit the extracted information by generating an HTTP request containing the information and sending the HTTP request over the network.

25. A system comprising:
   a server;
   an HTTP client, the HTTP client operable to receive files of a first type and files of a second type from the server; and a computer executable operable to be invoked by the HTTP client, the computer executable comprising:

instructions operable to process a file of the first file type, the file having file content, a first module that determines whether the file content includes content of a first content type, the first module performing a first function if the file content includes content of the first content type, and a second module that determines whether the file content includes content of a second content type, the second module performing a second function different from the first function if the file content includes content of the second content type;

where the HTTP client invokes the computer executable for processing files of the first type and but files of the second type.

26. A system comprising:

a client device including:

a web browser operable to receive files of a first type and files of a second type from a server in response to a client request where the files of the first type are forms data format (FDF) files, the web browser operable to determine the type of the received files; and a computer executable invoked by the web browser for processing received FDF files but not received files of the second type, the computer executable comprising:

instructions operable to process an FDF file, the file having file content, the file having a type associated with the computer executable, a first module that determines whether the file content includes content of a first content type, the first module performing a first function if the file content includes content of the first content type, and a second module that determines whether the file content includes content of a second content type, the second module performing a second function different from the first function if the file content includes content of the second content type.

27. The system of claim 26, where the file content includes one or more of an instruction file, a license file, and a portable document format (PDF) file.

* * * * *